Figures 1, 2:
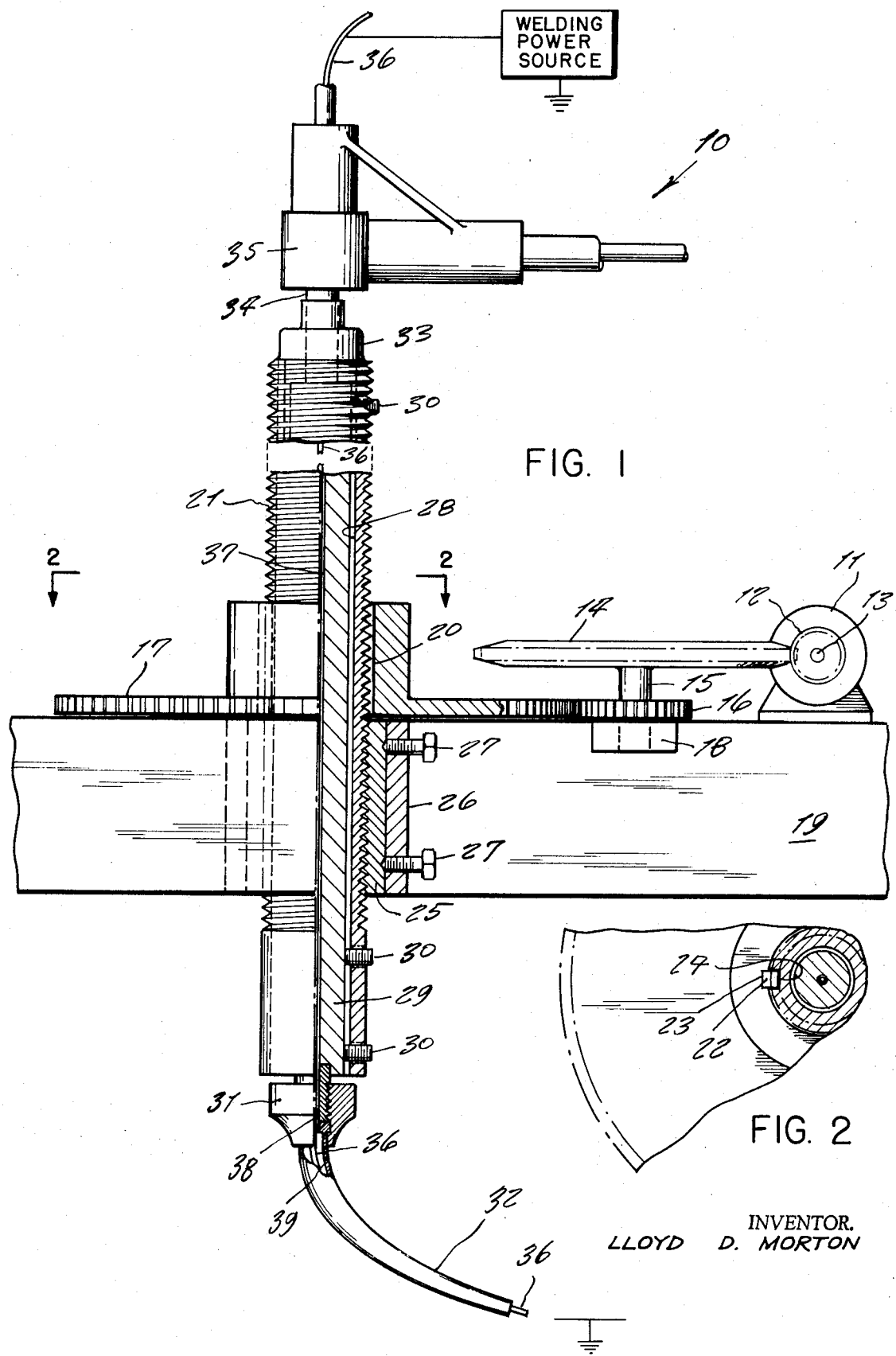

United States Patent
Morton

[15] 3,692,972
[45] Sept. 19, 1972

[54] AUTOMATIC ROTARY WELDING UNIT

[72] Inventor: Lloyd D. Morton, 241 W. Anoyo, Ajo, Ariz. 85321

[22] Filed: March 10, 1971

[21] Appl. No.: 122,945

[52] U.S. Cl. .................................. 219/76, 219/137
[51] Int. Cl. ........................................... B23k 9/04
[58] Field of Search ...... 219/76, 125, 68, 137; 74/20, 74/22, 23, 89.15; 314/40, 41, 42; 228/28, 29, 45

[56] References Cited

UNITED STATES PATENTS

| | | | |
|---|---|---|---|
| 1,840,600 | 1/1932 | Peck et al. .................... | 314/41 |
| 3,395,263 | 7/1968 | Kazlauskas ................ | 219/125 |
| 3,209,119 | 9/1965 | Keidel et al. ................. | 219/76 |
| 1,963,868 | 6/1934 | Sandelowsky et al. ...... | 314/41 |
| 1,884,396 | 10/1932 | Uecker .......................... | 74/22 |
| 1,840,735 | 1/1932 | Osborne ................. | 219/125 R |
| 3,461,269 | 8/1969 | Stevens et al. ......... | 219/125 R |
| 3,207,408 | 9/1965 | Thome et al. ................ | 228/29 |

Primary Examiner—J. V. Truhe
Assistant Examiner—George A. Montanye
Attorney—Schellin & Robertson

[57] ABSTRACT

A welding unit for building up the inside of vertical holes that must be subsequently reamed, the device comprising a mechanism utilizing a semi automatic welding machine and which includes means to fasten the end of a feeder cable and nozzle to the top of a rotary ground clamp having a one eight inch hole drilled through the center thereof for a wire to feed therethrough and which passes through the feeder cable mounted on a inside of a threaded shaft and then out of a nozzle.

1 Claim, 2 Drawing Figures

INVENTOR.
LLOYD D. MORTON

AUTOMATIC ROTARY WELDING UNIT

This invention relates generally to welding equipment.

A principal object of the present invention is to provide an automatic rotary welding unit and which is utilized so to build up the inside of vertical openings that have to be subsequently reamed.

Another object of the present invention is to provide an automatic rotary welding unit for building up the inside of vertical openings such as the center journal holes in an electric power shovel and final drive holes in shovel side frames and the like.

Other objects of the present invention are to provide an automatic rotary welding unit which is simple in design, inexpensive to manufacture, rugged in construction, easy to use and efficient in operation.

These and other objects will be readily evident upon the study of the following specification and accompanying drawing wherein:

FIG. 1 is an elevation view of the present invention shown partly in half cross section, and FIG. 2 is a fractional plan view thereof taken on the plane 2—2 of FIG. 1.

Referring now to the drawing in detail, the reference numeral 10 represents an automatic rotary welding unit according to the present invention wherein there is an electric motor 11 that drives a worm 12 secured upon a motor shaft 13, the worm 12 engaging a worm gear 14 affixed to a stub shaft 15 upon which there is also affixed a gear 16 which toothingly engages a geared collar flange 17. The shaft 15 is supported rotatably free within a bearing block 18 stationarily secured to a mounting bracket 19.

The geared collar flange 17 has a clearance opening 20 therethrough and through which an externally threaded shaft 21 extends. An axilally extending key 22 is engaged within keyway 23 on the geared collar flange and keyway 24 on the threaded shaft 21.

A barrel nut 25 having a threaded bore toothingly engages the threaded shaft 21, the threaded barrel nut being secured stationarily to a collar 26 by means of a purality of set screws 27. The collar 26 is intergal with the bracket 19.

The threaded shaft 21 is tubular throughout its length and accordingly provided with a central opening 28 within which there is positioned a feeder cable 29, the feeder cable 29 being held stationarily to the threaded shaft 21 by means of a plurality of set screws 30. The lower end of the feeder cable 29 is secured to a nozzle retainer 31 threadingly engaged there to and which threadingly supports a nozzle 32. As shown in FIG. 1, the nozzle 32 is of arcuate configuration so that the lower end thereof is pointed sidewardly.

The upper end of the threaded shaft 21 is fitted with a connecting collar 33 through which a member 34 extends, the lower end of the member 34 communicating with the feeder cable, the upper end of the member 34 communicating with a rotary ground clamp 35 and through which a welding rod 36 is fed as shown. The feeding cable 29 accordingly is provided with a central opening 37 extending centrally therethrough, the opening 37 being adapted to permit the welding rod 36 to be drawn downwardly to the nozzle 32. It is of course understood that the nozzle retainer 31 is likewise provided with a central opening 38, and the nozzle 32 is likewise provided with a central opening 39 to permit passage of the welding rod 36. In accordance with well known practice, current is applied to the end of welding rod 36 as indicated at the upper right hand side of FIG. 1, while the other end of rod 36 is grounded by engaging the work.

It is to be noted that the threaded shaft 21 is preferably threaded with five threads per inch for a best operation. It is to be further noted that the key way 24 is cut the entire length of the shaft 21 which is of 60 inches length. Such length can be varied according to the purposes of the job.

Thus there is provided an automatic rotary welding unit for building up the inside of a vertical opening that is subsequently machined out, such as central journal holes in electric power shovels and the like What I now claim is:

1. In an automatic welding machine including a power source and a ground provided by the work, a unit for feeding a welding rod to the work with circular and rectilineal movements, said unit comprising:
   a. a mounting bracket;
   b. a barrel nut having a threaded bore fixedly secured to said bracket;
   c. an externally threaded tubular shaft extending through said nut and in threaded engagement therewith;
   d. a collar drivably connected to said shaft by a sliding key;
   e. a flange integral with said collar and having external teeth constituting said flange a gear;
   f. a stub shaft rotatably mounted on said bracket and drivably carrying a gear meshing with the teeth on said flange;
   g. a worm gear drivably mounted on said stub shaft;
   h. a worm meshing with said worm gear;
   i. an electric motor drivably connected to said worm;
   j. a hollow feeder cable extending through said tubular shaft and fixedly secured thereto;
   k. a nozzle retainer secured to one end of said feeder cable and having an axial passage;
   l. a curved tubular nozzle carried by said nozzle retainer;
   m. a connecting collar on the other end of said tubular shaft, and
   n. a welding rod extending through said connecting collar, tubular shaft, nozzle retainer, and nozzle, said welding rod being connected to a power source and having a free end engaging the work whereby as said motor is operational, said welding rod is imparted a rectilineal movement and its free end a circular movement.

* * * * *